US011889372B2

(12) United States Patent
Peisa et al.

(10) Patent No.: US 11,889,372 B2
(45) Date of Patent: *Jan. 30, 2024

(54) WIRELESS COMMUNICATION DEVICE AND METHOD FOR NETWORK CONTROLLED BEAM BASED HANDOVER IN NR

(71) Applicant: Telefonaktiebolaget LM Ericsson (publ), Stockholm (SE)

(72) Inventors: Janne Peisa, Espoo (FI); Icaro Leonardo J. Da Silva, Solna (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,101

(22) Filed: May 5, 2022

(65) Prior Publication Data

US 2022/0264412 A1 Aug. 18, 2022

Related U.S. Application Data

(63) Continuation of application No. 16/901,769, filed on Jun. 15, 2020, now Pat. No. 11,419,031, which is a (Continued)

(51) Int. Cl.
*H04W 4/00* (2018.01)
*H04W 36/30* (2009.01)
(Continued)

(52) U.S. Cl.
CPC .......... *H04W 36/30* (2013.01); *H04B 7/0413* (2013.01); *H04B 7/0617* (2013.01);
(Continued)

(58) Field of Classification Search
None
See application file for complete search history.

(56) References Cited

U.S. PATENT DOCUMENTS

| 6,141,565 A | 10/2000 | Feuerstein et al. |
| 10,694,443 B2 | 6/2020 | Peisa et al. |
(Continued)

FOREIGN PATENT DOCUMENTS

| CN | 101400129 A | 4/2009 |
| CN | 104285385 A | 1/2015 |
(Continued)

OTHER PUBLICATIONS

Author Unknown, "Technical Specification Group Radio Access Network; NR; NR and NG-RAN Overall Description; Stage 2 (Release 15)," Technical Specification 38.300, Version 0.4.1, 3GPP Organizational Partners, Jun. 2017, 55 pages.
(Continued)

*Primary Examiner* — Bob A Phunkulh
(74) *Attorney, Agent, or Firm* — Withrow & Terranova, PLLC

(57) ABSTRACT

A method of operation of a wireless communication device to perform handover from a source cell to a target cell in a wireless communication system is provided. The wireless communication device performs (202) a beam tracking procedure for one or more neighbor cells to provide, for each neighbor cell, a list of tracked beams for the neighbor cell. The wireless communication device receives (212) a handover command from a source radio access node that instructs the wireless communication device to perform a handover from a source cell served by the source radio access node to a target cell served by a target radio access node. The target cell is one of the one or more neighbor cells for which the beam tracking procedure is performed. The wireless communication device then selects (214) a beam of
(Continued)

the target cell from the list of tracked beams for the target cell based on random access resource configuration and/or a quality threshold. The wireless communication device then performs (216) random access on the selected beam.

19 Claims, 10 Drawing Sheets

Related U.S. Application Data continuation of application No. 16/080,537, filed as application No. PCT/SE2018/050552 on May 31, 2018, now Pat. No. 10,694,443.

(60) Provisional application No. 62/525,559, filed on Jun. 27, 2017.

(51) Int. Cl.
| | |
|---|---|
| *H04B 7/0413* | (2017.01) |
| *H04B 7/06* | (2006.01) |
| *H04W 36/00* | (2009.01) |
| *H04W 36/08* | (2009.01) |
| *H04W 74/02* | (2009.01) |
| *H04W 74/08* | (2009.01) |
| *H04W 72/21* | (2023.01) |

(52) U.S. Cl.
CPC ....... *H04W 36/0083* (2013.01); *H04W 36/08* (2013.01); *H04W 72/21* (2023.01); *H04W 74/02* (2013.01); *H04W 74/0833* (2013.01)

(56) References Cited

U.S. PATENT DOCUMENTS

| | | | |
|---|---|---|---|
| 2007/0249402 A1 | 10/2007 | Dong et al. | |
| 2012/0106346 A1 | 5/2012 | Aguirre et al. | |
| 2013/0083695 A1 | 4/2013 | Narasimha et al. | |
| 2013/0083774 A1 | 4/2013 | Son et al. | |
| 2013/0121185 A1 | 5/2013 | Li et al. | |
| 2013/0336176 A1 | 12/2013 | Rubin et al. | |
| 2014/0010178 A1 | 1/2014 | Yu et al. | |
| 2014/0073329 A1 | 3/2014 | Kang et al. | |
| 2016/0099763 A1 | 4/2016 | Chen | |
| 2016/0150435 A1 | 5/2016 | Baek et al. | |
| 2017/0033854 A1 | 2/2017 | Yoo | |
| 2017/0195998 A1* | 7/2017 | Zhang | H04B 7/086 |
| 2017/0207843 A1 | 7/2017 | Jung et al. | |
| 2017/0215117 A1 | 7/2017 | Kwon et al. | |
| 2017/0223744 A1 | 8/2017 | Qian et al. | |
| 2017/0339662 A1 | 11/2017 | Lin et al. | |
| 2017/0359106 A1 | 12/2017 | John Wilson et al. | |
| 2017/0373739 A1 | 12/2017 | Guo et al. | |
| 2019/0349830 A1 | 11/2019 | Peisa et al. | |

FOREIGN PATENT DOCUMENTS

| | | |
|---|---|---|
| CN | 106817762 A | 6/2017 |
| WO | 2016018121 A1 | 2/2016 |
| WO | 2016122232 A1 | 8/2016 |
| WO | 2016163786 A1 | 10/2016 |
| WO | 2016163845 A1 | 10/2016 |
| WO | 2018127264 A1 | 7/2018 |

OTHER PUBLICATIONS

Author Unknown, "Technical Specification Group Radio Access Network; NR; Radio Resource Control (RRC); Protocol specification (Release 15)," Technical Specification 38.331, Version 0.0.4, 3GPP Organizational Partners, Jun. 2017, 22 pages.
Huawei et al., "R2-1706705: Baseline handover procedure for inter gNB handover in NR," Third Generation Partnership Project (3GPP), TSG-RAN WG2 Adhoc#2 on NR, Jun. 27-29, 2017, 7 pages, Qingdao, China.
International Search Report and Written Opinion for International Patent Application No. PCT/SE2018/050552, dated Jul. 27, 2018, 18 pages.
Non-Final Office Action for U.S. Appl. No. 16/080,537, dated Nov. 14, 2019, 14 pages.
International Preliminary Report on Patentability for International Patent Application No. PCT/SE2018/050552, completed Sep. 16, 2019, 28 pages.
Ericsson, "Tdoc R2-1707276: Further details of handover execution in NR," 3GPP TSG-RAN WG2, Ad Hoc on NR, Jun. 27-29, 2017, Qingdao, China, 9 pages.
Huawei, et al., "R1-1611242: DL RS Design for NR Beam Management," 3GPP TSG RAN WG1 Meeting #87, Nov. 14-18, 2016, Reno, Nevada, 5 pages.
Lenovo, et al., "R2-1706904: Analysis on NR handover in multi-beam operation," 3GPP TSG-RAN WG2 Meeting#AH, Jun. 27-29, 2017, Qingdao, China, 3 pages.
Mediatek Inc., "R2-1706435: Handover in NR Considering Multiple-beam Operation," 3GPPP TSG-RAN WG2 NR#2, Jun. 27-29, 2017, Qingdao, China, 6 pages.
Non-Final Office Action for U.S. Appl. No. 16/901,769, dated Sep. 10, 2021, 13 pages.
Final Office Action for U.S. Appl. No. 16/901,769, dated Feb. 7, 2022, 15 pages.
First Office Action for Chinese Patent Application No. 201880042881.X, dated Apr. 23, 2021, 24 pages.
Examination Report for European Patent Application No. 18731917.3, dated Nov. 23, 2021, 5 pages.
Notice of Reasons for Rejection for Japanese Patent Application No. 2019-571017, dated Mar. 9, 2021, 10 pages.
Notice of Reasons for Refusal for Japanese Patent Application No. 2019-571017, dated Jan. 4, 2022, 12 pages.
Examination Report for Indian Patent Application No. 202017001488, dated Mar. 24, 2021, 5 pages.
Office Action for Russian Patent Application No. 2020102736/07, dated Jul. 9, 2020, 11 pages.
Ericsson, "R2-1704101: Details of cell quality derivation," 3GPP TSG-RAN WG2 #98, May 15-19, 2017, Hangzhou, China, 4 pages.
Examination Report for European Patent Application No. 18731917.3, dated Feb. 20, 2023, 7 pages.

\* cited by examiner

*Inter-gNB handover procedures*

501. Configure the wireless device to:

perform a beam tracking procedure for one or more neighbor cells to provide, for each neighbor cell, a list of tracked beams for the neighbor cell;

upon receiving handover command from the source radio access node instructing the wireless communication device to perform a handover from source cell served by the source radio access node to target cell served by a target radio access node, select a beam of the target cell from a list of tracked beams for the target cell based on random access resource configuration and/or a quality threshold; and perform random access on the selected beam.

*FIG. 5B*

WIRELESS COMMUNICATION DEVICE AND METHOD FOR NETWORK CONTROLLED BEAM BASED HANDOVER IN NR

This application is a continuation of U.S. application Ser. No. 16/901,769, filed Jun. 15, 2020, now U.S. Pat. No. 11,419,031 B2, which is a continuation of U.S. application Ser. No. 16/080,537, filed Aug. 28, 2018, now U.S. Pat. No. 10,694,443, which is a 35 U.S.C. § 371 national phase filing of International Application No. PCT/SE2018/050552, filed May 31, 2018, which claims the benefit of U.S. Provisional Application No. 62/525,559, filed Jun. 27, 2017, the disclosures of which are incorporated herein by reference in their entireties.

TECHNICAL FIELD

Embodiments herein relate to a wireless communication device and a method therein. In particular, they relate to operating the wireless communication device to perform handover from a source cell to a target cell in a wireless communication system.

BACKGROUND

In Third Generation Partnership Project (3GPP) Technical Specification (TS) 38.300 V0.4.1, the New Radio (NR) handover mechanism is described as below.

Network controlled mobility applies to User Equipment devices (UEs) in RRC_CONNECTED and is categorized into two types of mobility: cell level mobility and beam level mobility. A beam when used herein is a reference signal transmitted within a cell i.e., a cell coverage may be obtained based on the combination of different reference signals termed as beams.

Cell Level Mobility requires explicit Radio Resource Control (RRC) signaling to be triggered, i.e. handover. For inter-NR base station (gNB) handover from a source gNB to a target gNB, the signaling procedures comprise at least the following elemental components illustrated in FIG. 1:

The source gNB initiates handover and issues 100 a handover Request to the target gNB over an Xn interface. The Xn interface is an interface between gNBs.

The target gNB performs 102 admission control and provides 104 an RRC configuration as part of the handover Acknowledgement. Admission control is a validation process in communication systems where a check is performed before the permission is granted for a connection to be established so that the available resources at the gNB are sufficient for the proposed connection. The RRC configuration comprises of parameters required for accessing the gNB, configuration of user and control plane to be used in the gNB.

The source gNB forwards 106 the RRC configuration to the UE in the handover Command. The handover Command message includes at least cell Identity (ID) and the information required to access the target cell so that the UE may access the target cell without reading system information broadcasted by the target cell. For some cases, the information required for contention-based and contention-free random access may be included in the handover Command message. The access information to the target cell may include beam specific information, if any.

The UE switches 108 to a new cell by moving the RRC connection to the target gNB and replies 110 the handover Complete.

In addition, in RAN2 #97bis meeting, there are the following further agreements for the procedures between steps 3 and 4:

| Agreements |
|---|
| 1 Handover command can contain at least cell identity of the target cell and Random Access Channel (RACH) configuration(s) associated to the beams of the target cell. RACH configuration(s) can include configuration for contention-free random access.<br>1b UE selects a suitable beam from all beams of the target cell.<br>1c UE performs CBRA on the UE's selected beam if CFRA resources are not provided for the UE's selected beam. |

SUMMARY

According to the agreement 1 b, the UE has to select a suitable beam from all beams of the target cell. However, the details of how the UE selects a suitable beam are not defined, and leaving this selection completely up to the UE implementation is problematic as:

The UE may select a beam with poor quality.

The network may allocate a designated preamble for the UE to use during random access, i.e. a Contention-Free Random Access (CFRA) procedure. According to the current agreement, the UE may choose to not select this beam, then the reservation of such a preamble is a waste and the successfulness of random access in the target cell may be affected.

An object of embodiments herein is thus to improve the handover performance of a wireless communication system.

According to a first aspect of embodiments herein, the object is achieved by a method of operation of a wireless communication device to perform handover from a source cell to a target cell in a wireless communication system. The wireless communication device performs a beam tracking procedure for one or more neighbor cells to provide, for each neighbor cell, a list of tracked beams for the neighbor cell. The wireless communication device receives a handover command from a source radio access node that instructs the wireless communication device to perform a handover from a source cell served by the source radio access node to a target cell served by a target radio access node. The target cell is one of the one or more neighbor cells for which the beam tracking procedure is performed. The wireless communication device then selects a beam of the target cell from the list of tracked beams for the target cell based on random access resource configuration and/or a relative or absolute quality threshold. The wireless communication device then performs random access on the selected beam.

According to a second aspect of embodiments herein, the object is achieved by a wireless communication device that performs handover from a source cell to a target cell in a wireless communication system. The wireless communication device is adapted to:

perform a beam tracking procedure for one or more neighbor cells to provide, for each neighbor cell, a list of tracked beams for the neighbor cell;

receive a handover command from a source radio access node that instructs the wireless communication device to perform a handover from a source cell served by the source radio access node to a target cell served by a target radio access node, wherein the target cell is one of the one or more neighbor cells for which the beam tracking procedure is performed;

select a beam of the target cell from the list of tracked beams for the target cell based on random access resource configuration and/or an relative or absolute quality threshold; and perform random access on the selected beam.

According to a third aspect of embodiments herein, the object is achieved by a method of operation of a radio access node to perform handover of a wireless communication device from a source cell to a target cell in a wireless communication system. The radio access node configures the wireless device to:

Perform a beam tracking procedure for one or more neighbor cells to provide, for each neighbor cell, a list of tracked beams for the neighbor cell;

upon receiving the handover command from the source radio access node that instructs the wireless communication device to perform a handover from a source cell served by the source radio access node to a target cell served by a target radio access node, select a beam of the target cell, cell B, from the list of tracked beams for the target cell based on random access resource configuration and/or a quality threshold; and perform random access on the selected beam.

According to a fourth aspect of embodiments herein, the object is achieved by a radio access node to perform handover of a wireless communication device from a source cell to a target cell in a wireless communication system. The radio access node is adapted to configure the wireless communication device to:

Perform a beam tracking procedure for one or more neighbor cells to provide, for each neighbor cell, a list of tracked beams for the neighbor cell;

upon receiving the handover command from the source radio access node that instructs the wireless communication device to perform a handover from a source cell served by the source radio access node to a target cell served by a target radio access node, select a beam of the target cell from the list of tracked beams for the target cell, based on random access resource configuration and/or a quality threshold; and perform random access on the selected beam.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 5B is a flow chart that illustrates embodiments of a method in a wireless communication device.

DETAILED DESCRIPTION

Figure 1:
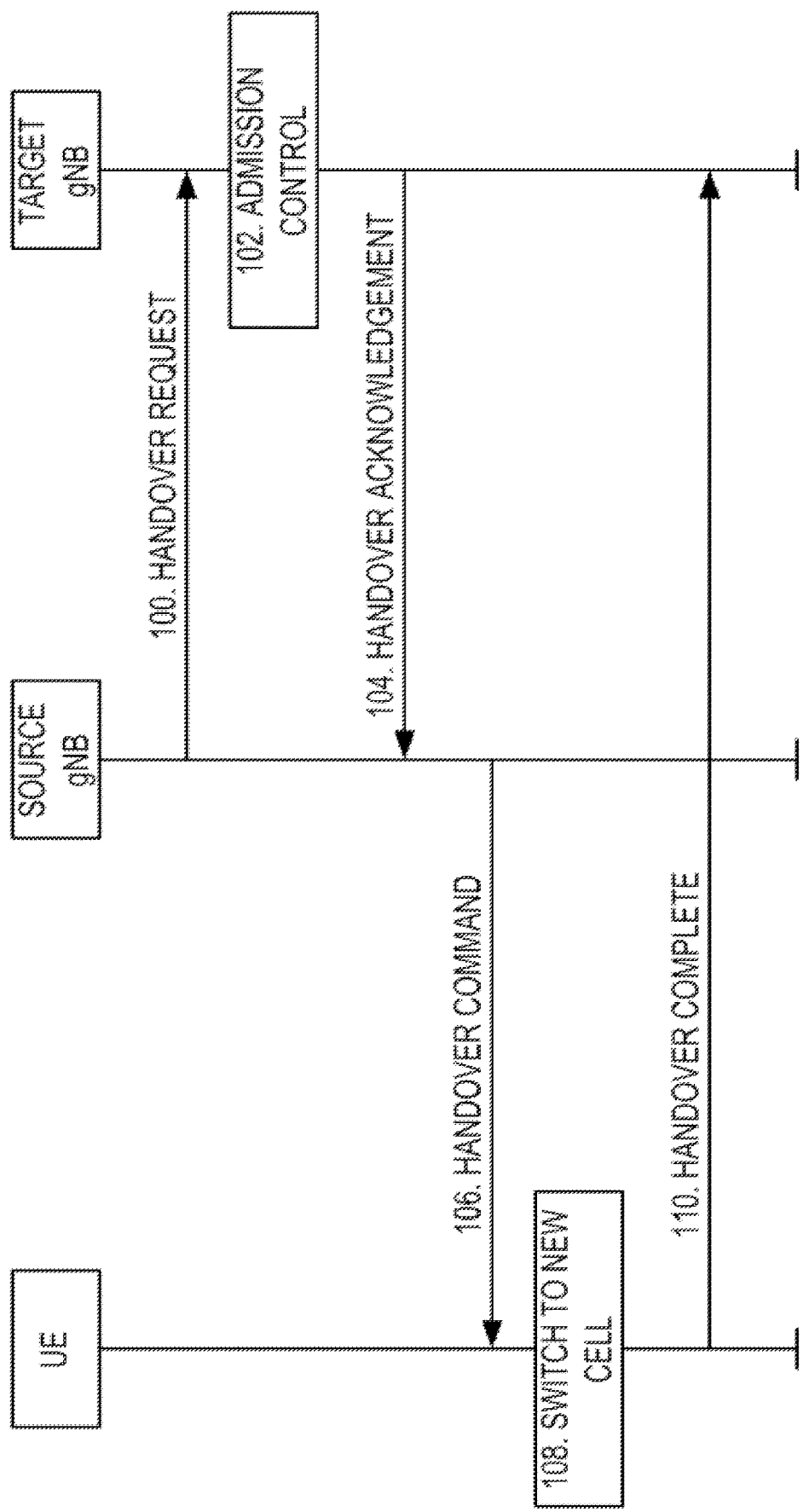
FIG. 1 is a schematic sequence diagram illustrating inter-gNB handover in Fifth Generation (5G) NR.

Examples herein relate to active mode mobility, and beam based handover such as network controlled beam based handover in NR.

According to embodiments herein, the problems of uncertainties regarding the UE's selection of beams to perform access to the target cell may be solved by specifying the UE, such as the wireless communication device, behavior when selecting a suitable beam, and/or providing one or more suitable quality thresholds to guide the beam selection. Potential thresholds include a minimum threshold for selecting a suitable beam and a threshold for a maximum allowed quality difference between a beam with a CFRA resource and a suitable beam.

Embodiments herein provide UE implementations such as wireless communication device implementations that will select beams in a consistent manner, meeting at least the minimum quality requirements from the network point of view. This will in the end lead to increased handover performance.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a gNB in a 3GPP 5G NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Figure 2:
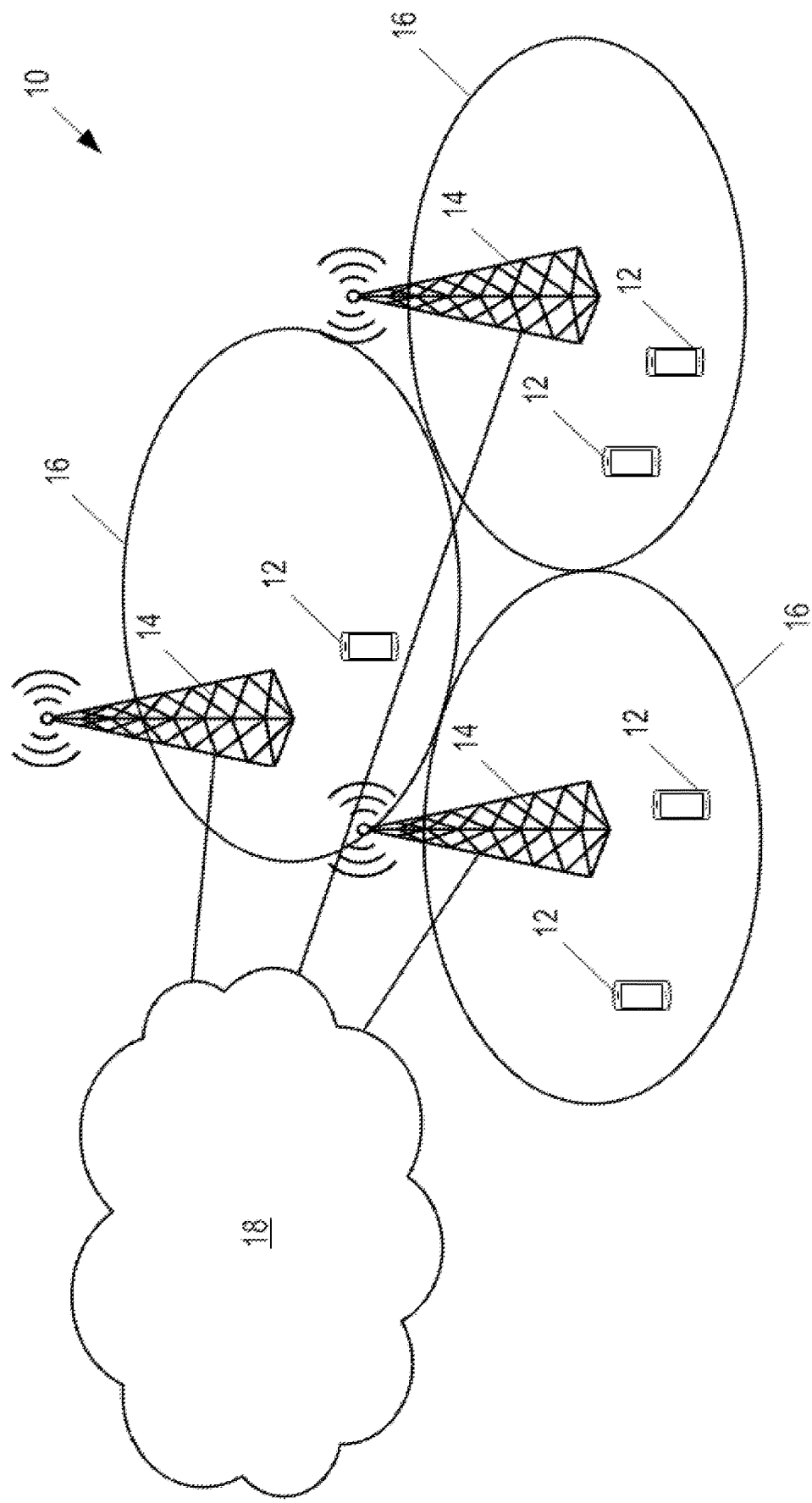
FIG. 2 is a schematic diagram illustrating one example of a wireless communication system in which embodiments of the present disclosure may be implemented.

In this regard, FIG. 2 illustrates one example of a wireless communication system 10 in which embodiments of the present disclosure may be implemented. The wireless communication system 10 is preferably a 3GPP 5G NR system, but is not limited thereto. As illustrated, the wireless communication system 10 includes a number of wireless communication devices 12, which are also referred to herein as UEs. In addition, the wireless communication system 10 includes a radio access network that includes a number of radio access nodes 14 (e.g., gNBs) serving corresponding coverage areas or cells 16 by means of beams. The radio access nodes 14 are connected to a core network 18, which includes a number of core network nodes, as will be appreciated by one of skill in the art.

Figure 3A:
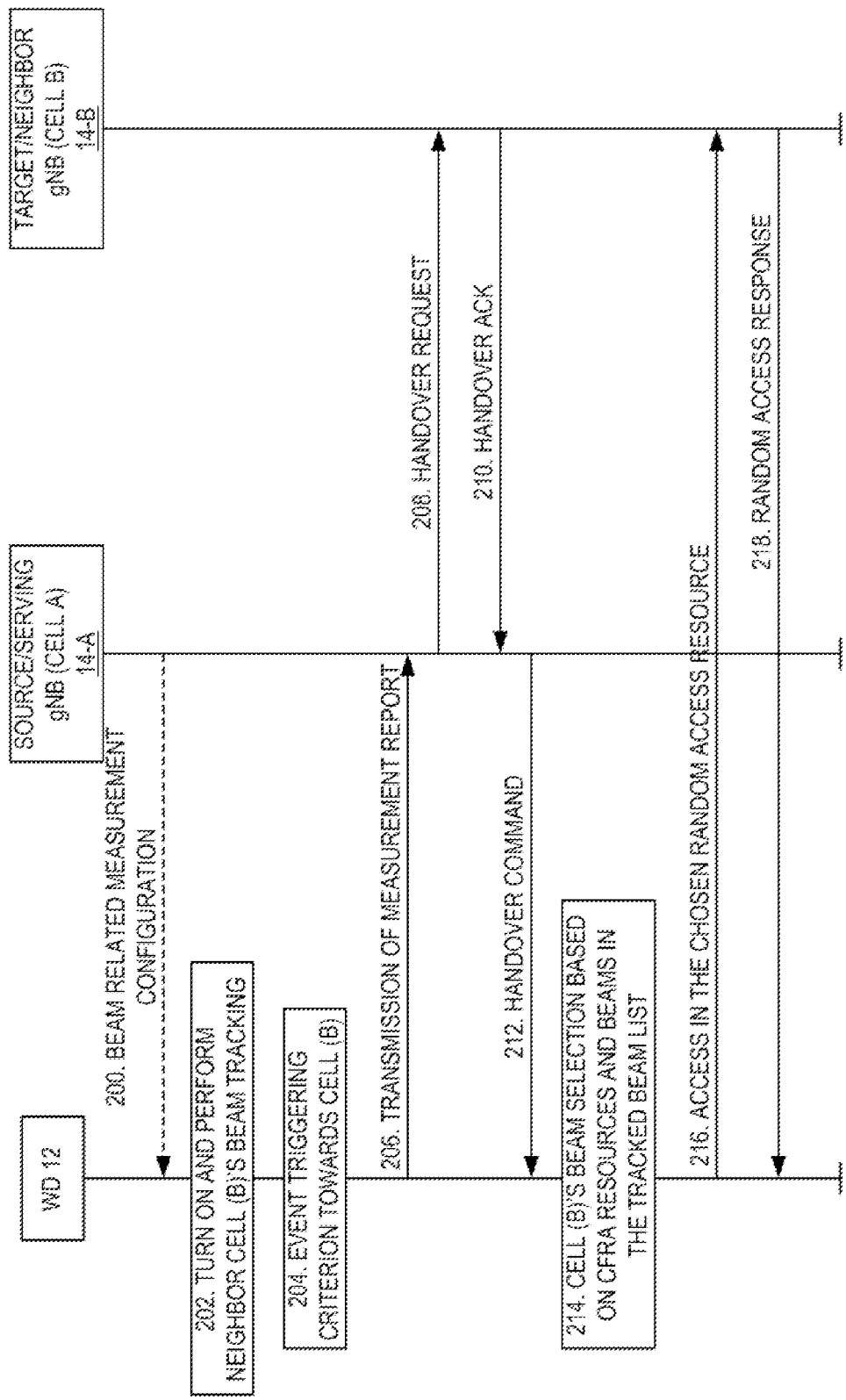
FIG. 3A is a schematic sequence diagram illustrating a beam-based handover procedure in accordance with some embodiments of the present disclosure.

FIG. 3A illustrates the operation of a wireless communication device 12 and radio access nodes 14 to perform an inter-radio access node, e.g., inter-gNB, handover according to some embodiments of the present disclosure. In this example, handover is performed from a source, or serving, radio access node 14-A that is serving cell 16-A (referred to as cell A) to a target, or neighbor, radio access node 14-B that is serving cell 16-B (referred to as cell B). Optional steps are indicated by dashed lines. Also, while the steps are illustrated as being performed in a particular order in FIG. 3A, the ordering of the steps may vary depending on the particular implementation.

As illustrated, the serving and/or source radio access node 14-A optionally sends a beam related measurement configuration to the wireless communication device 12 (step 200). The beam related measurement configuration may include:

Information that indicates one or more cells for which the wireless communication device 12 is to perform a beam tracking procedure. This information may include, e.g., A list of cells for which the wireless communication device 12 is to perform the beam tracking procedure, or An indicator that indicates that the wireless communication device 12 is to perform beam tracking for any cell that is detected by the wireless communication device 12.

Under which conditions the wireless communication device 12 shall perform the beam tracking procedure, such as e.g. any threshold that shall be used.

This may be a relative threshold to the events as configured by the serving cell. For example, if an A3 event specific threshold is 5 decibels (dB) then the wireless communication device 12 begins the beam tracking for the neighbor cell (cell B) when it comes within 15 dB of the serving cell, i.e. an additional offset of 10 dB. An A3 event is triggered by a UE when the neighbor cell becomes offset better than the PCell/PSCell.

This may be an absolute threshold with respect to the cell level quality, i.e. if the cell level quality is above a certain threshold then the wireless communication device 12 shall perform the beam level tracking.

The wireless communication device 12 turns on, or activates, the beam tracking procedure for cell B and begins performing and performs the beam tracking procedure for cell B (step 202). In some embodiments, the wireless communication device 12 turns on the beam tracking procedure for cell B when the condition(s) specified in the beam related measurement configuration are satisfied with respect to cell B.

Beams may be identified by reference signals. The beams may either be a Synchronization Signal (SS)-like signal (e.g., Primary Synchronization Signal (PSS) and/or Secondary Synchronization Signal (SSS) and/or Demodulation Reference Signal (DMRS)) or a Channel State Information Reference Signal (CSI-RS). If the signals are to be used for providing the CFRA resource allocation mapping, then the signal will be tracked by the wireless communication device 12. This may be controlled by the network. In some embodiments, the serving cell, i.e., the serving and/or source radio access node 14-A, configures the wireless communication device 12 to perform the beam tracking procedure on only SS block related signals and in some other embodiments the serving cell configures the wireless communication device 12 to perform beam tracking procedure for CSI-RS signals only and in yet another embodiment the serving cell configures the wireless communication device 12 to perform the beam tracking procedure on both SS block and CSI-RS signals.

For the beam tracking procedure, the wireless communication device 12 maintains a list of beams per neighbor cell, i.e. cells that are candidates for handover. This may be referred to as a beam tracking operation done by the wireless communication device 12 for neighbor cell beams. For each neighbor cell, the list of beams for that neighbor cell is ranked from the strongest (i.e., the best) beam to the weakest (i.e., the worst) beam, as measured by the wireless communication device 12. The cells whose lists of beams are to be maintained may be configured by the network implicitly or explicitly, e.g. the network provides the wireless communication device 12 with a list of cell identifiers or a condition the UE such as the wireless device 12 can verify, such as cells that triggered measurement events. The beams to be included in the list may be configured by the network, e.g. a certain number per neighbor cell. In some embodiments, the list of beams for a cell is updated every time the wireless communication device 12 performs beam level measurements for that purpose, i.e. accessing a target cell upon handover. The list of beams for a cell contains at least beam indexes, but it may also contain the associated radio conditions. In the case of only containing indexes, the wireless communication device 12 may be aware that only beams above an absolute threshold may be in the list. In the case of only containing indexes, the wireless communication device 12 may be aware that only beams whose radio conditions are not worse than a relative threshold from the best beam may be in the list. In the case of containing indexes and radio conditions, there could be Reference Signal Received Power (RSRP), Reference Signal Received Quality (RSRQ), and/or Signal to Interference plus Noise Ratio (SINR) per beam. In the case of containing indexes and radio conditions, there could be RSRP, RSRQ, and/or SINR only for the best beam and delta values for the other beams, per cell.

Upon the occurrence of a triggering criterion with respect to cell B, the wireless communication device 12 sends a measurement report to the serving and/or source radio access node 12 (steps 204 and 206).

Based on the measurement report, the serving and/or source radio access node 14-A decides that a handover should be performed to handover the wireless communication device 12 from cell A to cell B and, as such, the serving and/or source radio access node 14-A sends a handover request to the neighbor and/or target radio access node 14-B (step 208).

The neighbor and/or target radio access node 14-B sends a handover Acknowledgment (ACK) to the serving and/or source radio access node 14-A (step 210).

The serving and/or source radio access node 14-A then sends a handover command (e.g., RRCConnectionReconfiguration with mobilityControlInfo) to the wireless communication device 12 (step 212).

Note that the beam tracking procedure is, in this example, started prior to transmission of the measurement report and, while not illustrated, continues to be performed even after sending the measurement report and receiving the handover command. Alternatively, the beam tracking procedure may be started after sending the measurement report or even after receiving the handover command.

Upon receiving the handover command, the wireless communication device 12 performs a beam selection procedure to select a beam on cell B based on CFRA resources and beams being tracked for cell B in the beam tracking procedure (step 214).

The wireless communication device 12 then performs random access using selected, or chosen, random access resources (step 216) and receives a random access response from the target radio access node 14-B (step 218).

Figure 3B:
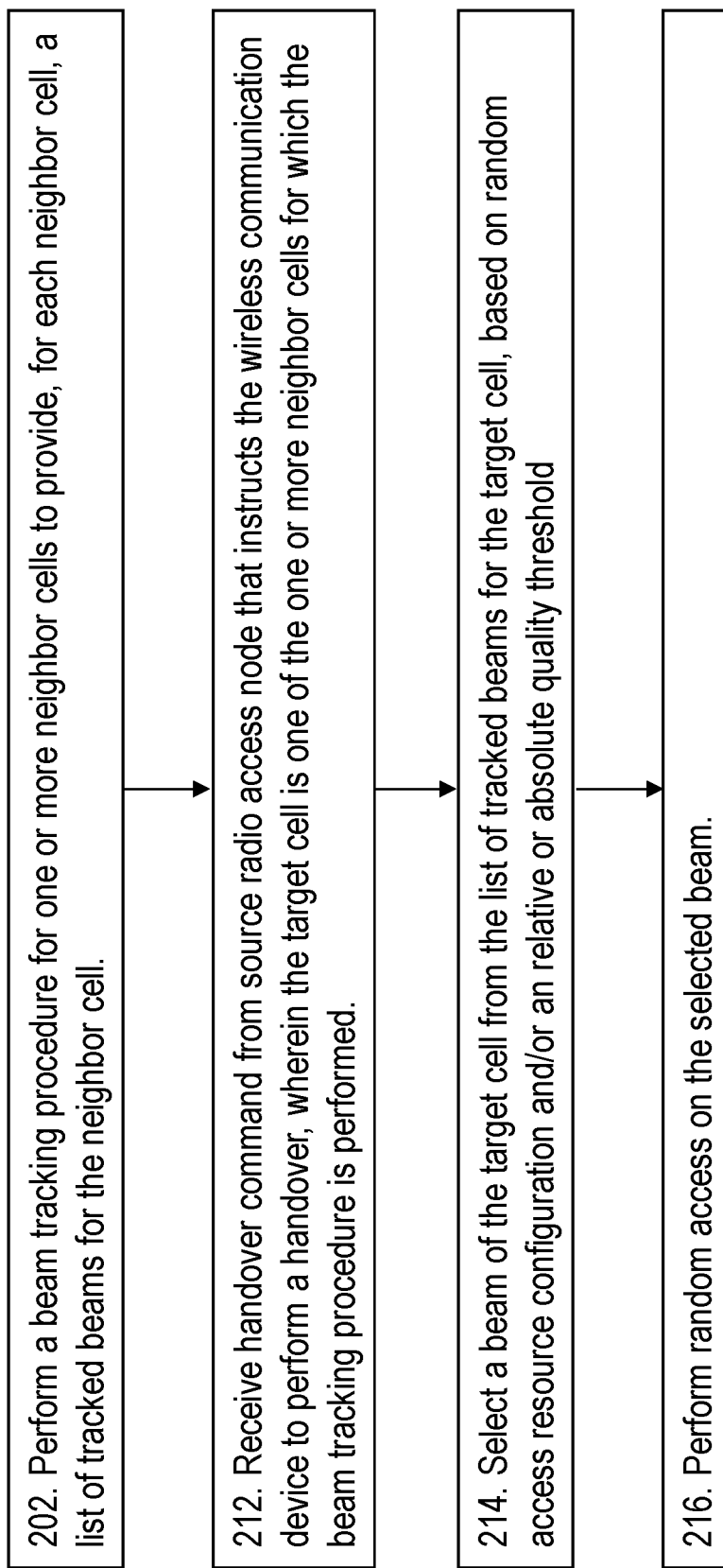
FIG. 3B is a flow chart that illustrates embodiments of a method in a wireless communication device.
Figure 4:
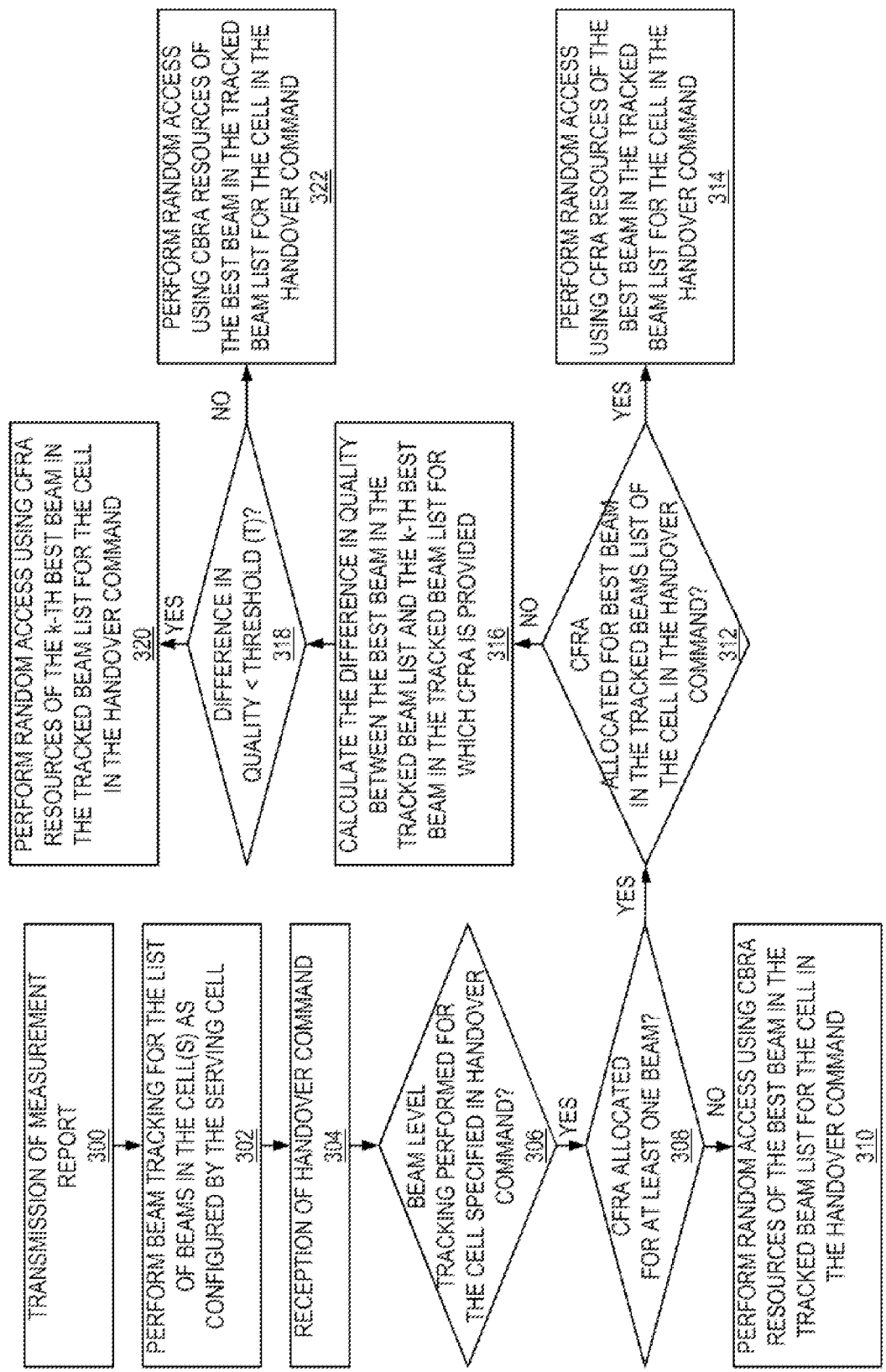
FIG. 4 is a flow chart that illustrates the operation of a wireless communication device to perform beam-based handover according to some embodiments of the present disclosure.

Example embodiments of a method of operation of the wireless communication device 12, such as a UE, to perform handover from a source cell to a target cell in a wireless communication system will now be described with reference to a flowchart depicted in FIG. 3B. FIG. 3B shows some of the steps depicted in FIG. 3A. Here the method is described from the view of the wireless communications device 12. Reference numbers 200-218 refer to both FIGS. 3A and 3B. Reference numbers 300-322 refer to FIG. 4 described below, and reference numbers 400-420 refer to FIG. 5A described below.

The method comprises the following steps, which steps may be taken in any suitable order. Actions that are optional are presented in dashed boxes in FIG. 3B.

Step 202

This action also relates to steps 302, 402.

The wireless communication device 12 performs beam tracking procedure for one or more neighbor cells to provide, for each neighbor cell, a list of tracked beams for the neighbor cell.

Step 212

This action also relates to steps 306, 406. The wireless communication device 12 receives a handover command from a source radio access node 14-A. The handover command instructs the wireless communication device 12 to perform a handover from a source cell, cell A, served by the source radio access node 14-A to a target cell, cell B, served by a target radio access node 14-B. The target cell, cell B, is one of the one or more neighbor cells for which the beam tracking procedure is performed.

Step 214

This action also relates to steps 306, 308, 312, 316, 318, 406, 408, 412, and 416.

The wireless communication device 12 selects a beam of the target cell, cell B, from the list of tracked beams for the target cell, cell B, based on random access resource configuration and/or a relative or absolute quality threshold.

According to the first embodiments, dedicated RACH resources (if provided) where the beam quality measured on the associated NR-SS or CSI-RS is above a threshold are prioritized.

According to some first embodiments the wireless communication device 12 selects the beam of the target cell, cell B, from the list of tracked beams for the target cell, cell B.

E.g. the UE checks (step 412) if for the strongest tracked beam, the contention free random access is provided and if the beam quality is above a configured threshold, if so (YES), then the wireless communication device 12 selects the strongest beam for performing random access (step 414).

Further, if the strongest tracked beam does not have a contention-free random access allocated, then: the wireless communication device 12 selects the beam of the target cell, cell B, from the list of tracked beams for the target cell, cell B by:

determining, step 412, NO, that there are no dedicated random access channel resources allocated for contention-free random access for the best beam in the list of tracked beams for the target cell, cell B; and upon determining that there are no dedicated random access channel resources allocated for contention-free random access for the best beam in the list of tracked beams for the target cell, cell B, determining, step 416, whether a quality of a k-th best beam in the list of tracked beams for the target cell, cell B, is greater than a threshold, the k-th best beam being a beam e.g. the strongest tracked beam, for which dedicated (contention-free) random access channel resources are allocated. The selected beam of the target cell is the k-th best beam if the quality of the k-th best beam is greater than the threshold. The k-th best beam when used herein means the strongest beam for which the contention-free random access resource is allocated and this bema is above the configured threshold.

According to some second embodiments, the wireless communication device 12 selects the beam of the target cell, cell B, from the list of tracked beams for the target cell, cell B, by:

Determining, step 312, NO, that there are no dedicated random access channel resources allocated for contention-free random access for the best beam in the list of tracked beams for the target cell, cell B; and upon determining that there are no dedicated random access channel resources allocated for contention-free random access for the best beam in the list of tracked beams for the target cell, cell B, determining, step 316, a difference between a quality of the best beam in the list of tracked beams for the target cell, cell B, and a quality of a k-th best beam in the list of tracked beams for the target cell, cell B. The k-th best beam is a beam for which dedicated random access channel resources are allocated; and determining, step 318, whether the difference is less than a threshold, where the selected beam of the target cell is the k-th best beam if the difference is less than the threshold.

In some specific of the first and second embodiments, the wireless communication device 12 selects the beam of the target cell, cell B, from the list of tracked beams for the target cell, cell B, by selecting, steps 308, 408, the best beam in the list of tracked beams for the target cell, cell B, if no dedicated random access channel resources are allocated for contention-free random access for any of the beams in the list of tracked beams for the target cell.

In some other of the first and second embodiments, the wireless communication device 12 selects the beam of the target cell, cell B, from the list of tracked beams for the target cell, cell B, by selecting, steps 308, 408, the best beam in the list of tracked beams for the target cell, cell B, if dedicated random access channel resources are allocated for contention-free random access for the best beam in the list of tracked beams for the target cell.

Step 216

This action also relates to steps 310, 314, 320, 322, 410, 414, 418, and 420.

The wireless communication device 12 then performs random access on the selected beam.

In some of the first embodiments, if the quality of the k-th best beam is greater than the threshold, the wireless communication device 12 performs the random access on the selected beam by performing 418 contention-free random access on the k-th best beam using the dedicated random access channel resources of the k-th best beam. Further, in some of the first embodiments, if the quality of the k-th best beam is not greater than the threshold, the wireless communication device 12 performs random access on the selected beam comprises by performing 420 contention-based random access on the best beam, such as on the best tracked beam, using the contention-based random access channel resources of the best beam.

In some of the second embodiments, if the difference is less than the threshold, the wireless communication device 12 performs random access on the selected beam by performing, step 320, contention-free random access on the k-th best beam using the dedicated random access channel resources of the k-th best beam. Further, in some of the second embodiments, if the difference is not less than the threshold, the wireless communication device 12 performs random access on the selected beam by performing, step 322, contention-based random access on the best beam using the contention-based random access channel resources of the best beam.

In some of the first and second, embodiments wherein no dedicated random access channel resources are allocated for contention-free random access for any of the beams in the list of tracked beams for the target cell, the wireless communication device 12 performs random access on the selected beam by performing, step 310, 410 contention-based random access on the best beam using contention-based random access channel resources of the best beam.

In some of the fourth embodiments wherein dedicated random access channel resources are allocated for contention-free random access for the best beam in the list of tracked beams for the target cell, the wireless communication device 12 performs random access on the selected beam comprises by performing 314, 414 contention free random access on the best beam using the dedicated random access channel resources of the best beam.

Figure 5A:
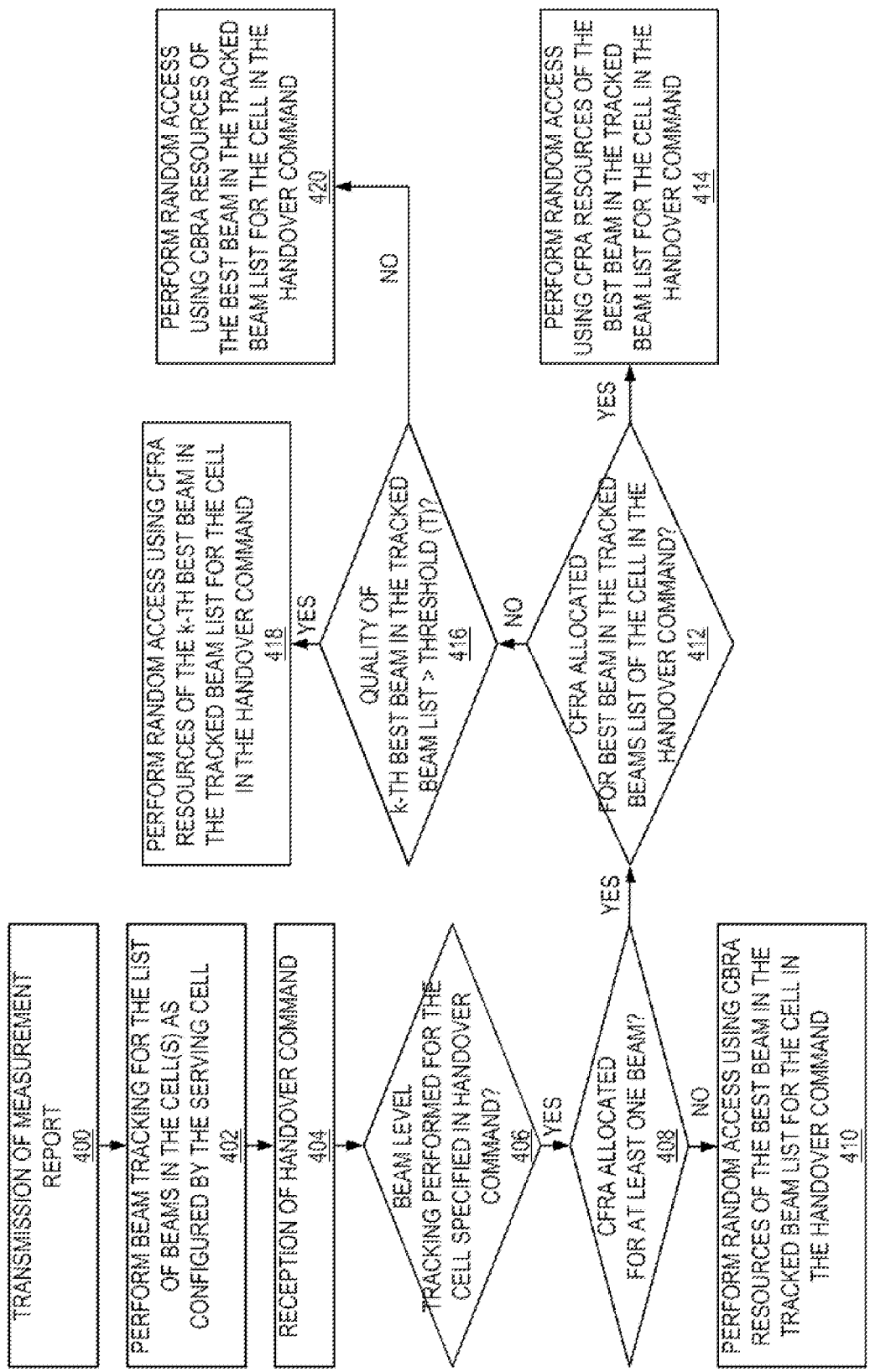
FIG. 5A is a flow chart that illustrates the operation of a wireless communication device to perform beam-based handover according to some other embodiments of the present disclosure.

The details of steps 214 and 216 for two example embodiments, i.e. the first and second example embodiments, of the present disclosure are described in detail below with respect to FIGS. 4 and 5A, wherein FIG. 5A depicts the first embodiments, and FIG. 4 depicts the second embodiments.

The second embodiments will be described first.

In this regard, FIG. 4 illustrates the operation of a wireless communication device 12 according to some embodiments of the present disclosure such as the second embodiments. As discussed above with respect to steps 200-212 in FIGS. 3A and 3B, the wireless communication device 12 transmits a measurement report to the serving and/or source radio access node 14-A, performs beam tracking for the list of beams in the cell(s) as configured by the serving and/or source radio access node 14-A for the serving cell A, and receives a handover command from the serving and/or source radio access node 14-A for handover to the neighbor and/or target cell B (steps 300-304).

The remainder of the process of FIG. 4 illustrates steps 214 and 216 of FIG. 3 a and b in more detail according to one embodiment of the present disclosure such as the second embodiment. In order to perform beam selection for cell B, upon receiving the handover command, the wireless communication device 12 verifies the target cell identifier and checks whether the wireless communication device 12 maintains a list of beams for that particular cell. In other words, the wireless communication device 12 determines whether beam tracking is being performed for the target cell for the handover (step 306).

If YES, the wireless communication device 12 checks whether the handover command contains dedicated CFRA Random Access Channel (RACH) resource(s) for at least one beam of the target cell (step 308).

If there are no dedicated resources for CFRA for any of the beams of the target cell, the wireless communication device 12 performs random access using configured Contention-Based Random Access (CBRA) resources of the best beam in the tracked beam list for the target cell (step 310, NO).

However, if verification confirms that there are dedicated resources for CFRA for one or more beams of the target cell, the wireless communication device 12 checks (Step 312) the tracked beam list for the target cell, starting from the best beam, to determine whether network has provided dedicated RACH resources (i.e., RACH resources dedicated for CFRA).

If the best beam in the tracked beam list for the target cell has dedicated RACH resources (step 312, YES), the wireless communication device 12 performs CFRA using the dedicated RACH resources configured for the best beam (step 314).

If the network has not allocated dedicated RACH resources for the best beam (step 312, NO), the wireless communication device 12 identifies the k-th best beam in the tracked beam list of the target cell and calculates, or otherwise determines, a difference in a quality (e.g., RSRP, RSRQ, or SINR) of the best beam in the tracked beam list of the target cell and a quality (e.g., RSRP, RSRQ, or SINR) of the k-th best beam in the tracked beam list of the target cell (step 316). The k-th best beam in a beam in the tracked beam list for which dedicated RACH resources are allocated by the network. In some embodiments, the k-th best beam is the strongest/best beam in the tracked beam list for the target cell for which dedicated RACH resources are allocated.

The wireless communication device 12 determines whether the difference between the quality of the best beam and the quality of the k-th best beam is less than a predefined (e.g., configured) threshold (step 318).

If difference is less than the threshold, the wireless communication device 12 performs random access using the dedicated resources, i.e., the CFRA resources, of the k-th best beam in the tracked beam list of the target cell (step 320).

If the difference is not less than the threshold, the wireless communication device 12 performs random access using CBRA resources of the best beam in the tracked beam list of the target cell (step 322). Thus, the wireless communication device 12 accesses the k-th best beam whose dedicated RACH resources have been provided only if the k-th best beam has a quality not worse than a relative threshold from the best beam.

If the tracked beam list for the target cell has a single beam and no dedicated resources have been provided to it, the wireless communication device 12 performs CBRA associated to the best beam.

An advantage with the second embodiments is that the wireless communication device 12 shall select a beam with very good quality even if there is no CFRA reserved for it and if there is another weak beam for which CFRA is allocated is still available. Although there is an increased collision probability, the wireless communication device 12 selects the best beam if it is very good compared to the best beam for which CFRA resources are provided. This will aid in faster convergence of link beam towards the UE.

FIG. 5A illustrates an embodiment such as the first embodiments, that is similar to that of FIG. 4 but where the wireless communication device 12 accesses the k-th best beam whose dedicated RACH resources have been provided only if the k-th best beam is above an absolute threshold. More specifically, as discussed above with respect to steps 200-212 of FIGS. 3A and 3B, the wireless communication device 12 transmits a measurement report to the serving and/or source radio access node 14-A, performs beam tracking for the list of beams in the cell(s) as configured by the serving and/or source radio access node 14-A for the serving cell A, and receives a handover command from the serving and/or source radio access node 14-A for handover to the neighbor and/or target cell B (steps 400-404).

The remainder of the process of FIG. 5A illustrates steps 214 and 216 of FIGS. 3A and 3B in more detail according to one embodiment of the present disclosure. In order to perform beam selection for cell B, upon receiving the handover command, the wireless communication device 12 verifies the target cell identifier and checks whether the wireless communication device 12 maintains a list of beams for that particular cell. In other words, the wireless communication device 12 determines whether beam tracking is being performed for the target cell for the handover (step 406).

If YES, the wireless communication device 12 checks whether the handover command contains dedicated CFRA RACH resource(s) for at least one beam of the target cell (step 408).

If there are no dedicated resources for CFRA for any of the beams of the target cell, the wireless communication device 12 performs random access using configured CBRA resources of the best beam in the tracked beam list for the target cell (step 410).

However, if verification confirms that there are dedicated resources for CFRA for one or more beams of the target cell, the wireless communication device 12 checks (step 412) the tracked beam list for the target cell, starting from the best beam, to determine whether network has provided dedicated RACH resources (i.e., RACH resourced dedicated for CFRA).

If the best beam in the tracked beam list for the target cell has dedicated RACH resources (step 412, YES), the wireless communication device 12 performs CFRA using the dedicated RACH resources configured for the best beam (step 414).

If the network has not allocated dedicated RACH resources for the best beam (step 412, NO), the wireless communication device 12 identifies the k-th best beam in the tracked beam list of the target cell and determines whether a quality (e.g., RSRP, RSRQ, or SINR) of the k-th best beam in the tracked beam list of the target cell is greater than a predefined (e.g., configured) threshold (step 416).

The k-th best beam is a beam in the tracked beam list for which dedicated RACH resources are allocated by the network. In some embodiments, the k-th best beam is the strongest/best beam in the tracked beam list for the target cell for which dedicated RACH resources are allocated. If the quality of the k-th best beam is greater than the threshold, the wireless communication device 12 performs random access using the dedicated resources, i.e., the CFRA resources, of the k-th best beam in the tracked beam list of the target cell (step 418).

If the quality of the k-th best beam is not greater than the threshold, the wireless communication device 12 performs random access using CBRA resources of the best beam in the tracked beam list of the target cell (step 420). Thus, the wireless communication device 12 accesses the k-th best beam whose dedicated RACH resources have been provided only if the k-th best beam has a quality that is greater than an absolute threshold.

If the tracked beam list for the target cell has a single beam and no dedicated resources have been provided to it, the wireless communication device 12 performs CBRA associated to the best beam.

An advantage with the first embodiments is that the wireless communication device 12 shall use the CFRA resources as long as the beams for which these CFRA are provided are above the configured threshold. This will nullify the RA collision probability and provide better uplink access to the wireless communication device 12 to the target cell.

Example embodiments of a method of operation of the radio access node 14 such as the source radio access node 14-A, to perform handover of a wireless communication device 12 from a source cell to a target cell in a wireless communication system 10, will now be described with reference to a flowchart depicted in FIG. 5B.

The method comprises the following step.

Step 501

This step relates to step 200.

The radio access node 14 configures the wireless device 12 to:

perform 202, 302, 402 a beam tracking procedure for one or more neighbor cells to provide, for each neighbor cell, a list of tracked beams for the neighbor cell;

upon receiving the handover command from the source radio access node 14-A that instructs the wireless communication device 12 to perform a handover from a source cell, cell A, served by the source radio access node 14-A to a target cell, cell B, served by a target radio access node 14-B, select 214, 306, 308, 312, 316, 318, 406, 408, 412, 416 a beam of the target cell, cell B, from the list of tracked beams for the target cell, cell B, based on random access resource configuration and/or a quality threshold; and perform 216, 310, 314, 320, 322, 410, 414, 418, 420 random access on the selected beam.

In some embodiments, the configuring of the wireless communication device 12 to select 214, 306, 308, 312, 316, 318, 406, 408, 412, 416 the beam of the target cell, cell B, from the list of tracked beams for the target cell, cell B, further comprises configuring the wireless communication device 12 to:

determine step 412, NO that there are no dedicated random access channel resources allocated for contention-free random access for the best beam in the list of tracked beams for the target cell, cell B; and upon determining that there are no dedicated random access channel resources allocated for contention-free random access for the best beam in the list of tracked beams for the target cell, cell B:

determine 416 whether a quality of a k-th best beam in the list of tracked beams for the target cell, cell B, is greater than a threshold, the k-th best beam being a beam for which dedicated random access channel resources are allocated, where the selected beam of the target cell is the k-th best beam if the quality of the k-th best beam is greater than the threshold.

In some embodiments, the radio access node 14 configures the wireless communication device 12 to, if the quality of the k-th best beam is greater than the threshold, perform 216, 310, 314, 320, 322, 410, 414, 418, 420 random access on the selected beam by performing 418 contention-free random access on the k-th best beam using the dedicated random access channel resources of the k-th best beam.

In some embodiments, the radio access node 14 further configures the wireless communication device 12 to, if the quality of the k-th best beam is not greater than the threshold, perform 216, 310, 314, 320, 322, 410, 414, 418, 420 random access on the selected beam by performing 420 contention-based random access on the best beam using the contention-based random access channel resources of the best beam.

Figure 6:
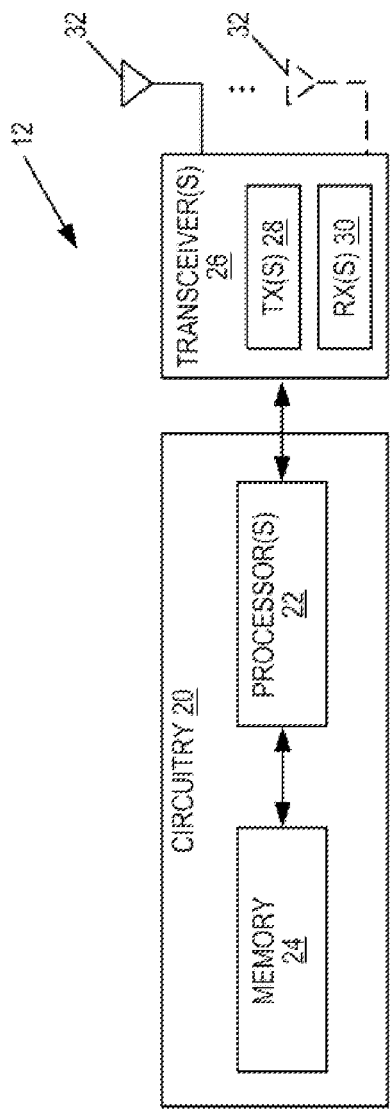
FIGS. 6 and 7 are a schematic diagrams that illustrate example embodiments of a wireless communication device.

FIG. 6 is a schematic block diagram of the wireless communication device 12, or UE, according to some embodiments of the present disclosure. As illustrated, the wireless communication device 12 includes circuitry 20 comprising one or more processors 22 (e.g., Central Processing Units (CPUs), Application Specific Integrated Circuits (ASICs), Field Programmable Gate Arrays (FPGAs), Digital Signal Processors (DSPs), and/or the like) and memory 24. The wireless communication device 12 also includes one or more transceivers 26 each including one or more transmitters 28 and one or more receivers 30 coupled to one or more antennas 32. In some embodiments, the functionality of the wireless communication device 12 described herein may be implemented in hardware (e.g., via hardware within the circuitry 20 and/or within the processor (s) 22) or be implemented in a combination of hardware and software (e.g., fully or partially implemented in software that is, e.g., stored in the memory 24 and executed by the processor(s) 22).

In some embodiments, a computer program including instructions which, when executed by the at least one processor 22, causes the at least one processor 22 to carry out at least some of the functionality of the wireless communication device 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 7:
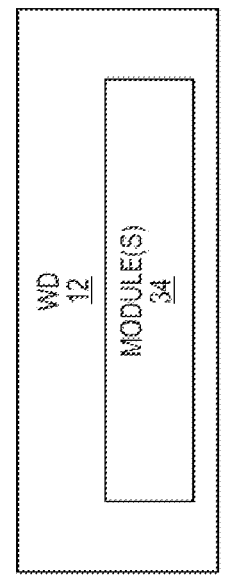

FIG. 7 is a schematic block diagram of the wireless communication device 12, or UE, according to some other embodiments of the present disclosure. The wireless communication device 12 includes one or more modules 34, each of which is implemented in software. The module(s) 34 provide the functionality of the wireless communication device 12 described herein (e.g., as described with respect to FIGS. 3A and 3B, 4, and/or 5A and 5B).

To perform the method steps above for performing handover, e.g., inter-radio access node handover, from a source cell to a target cell in a wireless communication system 10, the wireless communication device 12, may comprise the following arrangement e.g. as depicted in FIG. 7.

The wireless communication device 12 is adapted to, e.g. by means of one of the modules 34 in the wireless communication device 12, such as a performing module, perform a beam tracking procedure for one or more neighbor cells to provide, for each neighbor cell, a list of tracked beams for the neighbor cell.

The wireless communication device 12 is further adapted to, e.g. by means of one of the modules 34 in the wireless communication device 12, such as a receiving module, receive a handover command from a source radio access node 14-A that instructs the wireless communication device 12 to perform a handover from a source cell, cell A, served by the source radio access node 14-A to a target cell, cell B, served by a target radio access node 14-B, wherein the target cell, cell B, is one of the one or more neighbor cells for which the beam tracking procedure is performed;

The wireless communication device 12 is further adapted to, e.g. by means of one of the modules 34 in the wireless communication device 12, such as a selecting module, select a beam of the target cell, cell B, from the list of tracked beams for the target cell, cell B, based on random access resource configuration and/or an relative or absolute quality threshold.

The wireless communication device 12 is further adapted to, e.g. by means of one of the modules 34 in the wireless communication device 12, such as a performing module, perform random access on the selected beam.

The wireless communication device 12 may further be adapted to e.g. by means of one of the modules 34 in the wireless communication device 12, such as the selecting module, select the beam of the target cell, cell B, from the list of tracked beams for the target cell, cell B, by:

determine that there are no dedicated random access channel resources allocated for contention-free random access for the best beam in the list of tracked beams for the target cell, cell B; and upon determining that there are no dedicated random access channel resources allocated for contention-free random access for the best beam in the list of tracked beams for the target cell, cell B:

determine whether a quality of a k-th best beam in the list of tracked beams for the target cell, cell B, is greater than a threshold, the k-th best beam being a beam for which dedicated random access channel resources are allocated, where the selected beam of the target cell is the k-th best beam if the quality of the k-th best beam is greater than the threshold.

The wireless communication device 12 may further be adapted to e.g. by means of one of the modules 34 in the wireless communication device 12, such as the performing module, if the quality of the k-th best beam is greater than the threshold, perform random access on the selected beam by performing contention-free random access on the k-th best beam using the dedicated random access channel resources of the k-th best beam.

The wireless communication device 12 may further be adapted to e.g. by means of one of the modules 34 in the wireless communication device 12, such as the performing module, if the quality of the k-th best beam is not greater than the threshold, perform random access on the selected beam by performing contention-based random access on the best beam using the contention-based random access channel resources of the best beam.

The wireless communication device 12 may further be adapted to e.g. by means of one of the modules 34 in the wireless communication device 12, such as the selecting module, select the beam of the target cell, cell B, from the list of tracked beams for the target cell, cell B, by: selecting the best beam in the list of tracked beams for the target cell, cell B, if no dedicated random access channel resources are allocated for contention-free random access for any of the beams in the list of tracked beams for the target cell.

The wireless communication device 12 may further be adapted to e.g. by means of one of the modules 34 in the wireless communication device 12, such as the performing module, perform random access on the selected beam by performing contention-based random access on the best beam using contention-based random access channel resources of the best beam.

The wireless communication device 12 may further be adapted to e.g. by means of one of the modules 34 in the wireless communication device 12, such as the selecting module, select the beam of the target cell, cell B, from the list of tracked beams for the target cell, cell B, by:

selecting the best beam in the list of tracked beams for the target cell, cell B, if dedicated random access channel resources are allocated for contention-free random access for the best beam in the list of tracked beams for the target cell.

The wireless communication device 12 may further be adapted to e.g. by means of one of the modules 34 in the wireless communication device 12, such as the performing module, perform random access on the selected beam by performing contention free random access on the best beam using the dedicated random access channel resources of the best beam.

The wireless communication device 12 may further be adapted to e.g. by means of one of the modules 34 in the wireless communication device 12, such as the selecting module, select the beam of the target cell, cell B, from the list of tracked beams for the target cell, cell B, by:

determining that there are no dedicated random access channel resources allocated for contention-free random access for the best beam in the list of tracked beams for the target cell, cell B; and upon determining that there are no dedicated random access channel resources allocated for contention-free random access for the best beam in the list of tracked beams for the target cell, cell B:

determine a difference between a quality of the best beam in the list of tracked beams for the target cell, cell B, and a quality of a k-th best beam in the list of tracked beams for the target cell, cell B, the k-th best beam being a beam for which dedicated random access channel resources are allocated; and determine whether the difference is less than a threshold, where the selected beam of the target cell is the k-th best beam if the difference is less than the threshold.

The wireless communication device 12 may further be adapted to e.g. by means of one of the modules 34 in the wireless communication device 12, such as the performing module, if the difference is less than the threshold, perform random access on the selected beam by performing contention-free random access on the k-th best beam using the dedicated random access channel resources of the k-th best beam.

The wireless communication device 12 may further be adapted to e.g. by means of one of the modules 34 in the wireless communication device 12, such as the performing module, if the difference is not less than the threshold, perform random access on the selected beam by performing contention-based random access on the best beam using the contention-based random access channel resources of the best beam.

Figure 8:
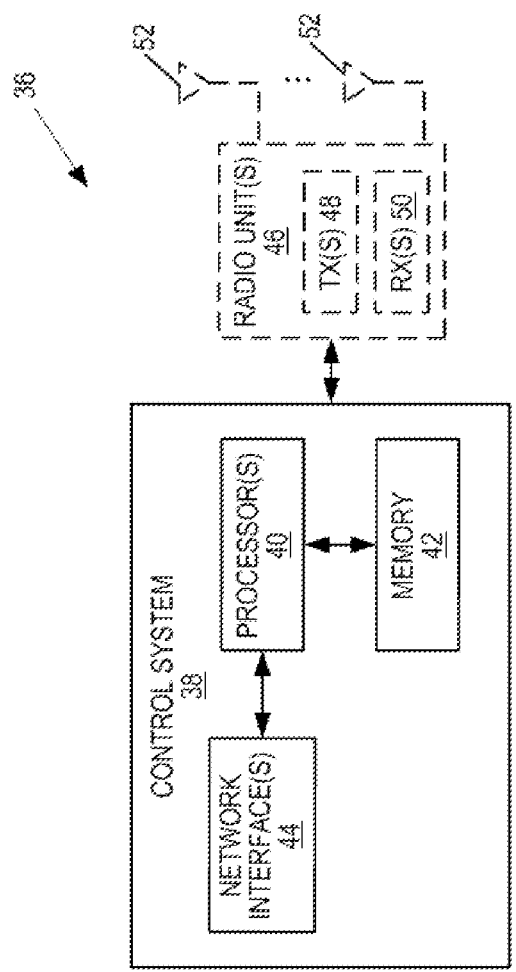
FIGS. 8 through 10 are a schematic diagrams that illustrate example embodiments of a network node.

FIG. 8 is a schematic block diagram of a network node 36 (e.g., a radio access node 14 such as, for example, a gNB) according to some embodiments of the present disclosure. As illustrated, the network node 36 includes a control system 38 that includes circuitry comprising one or more processors 40 (e.g., CPUs, ASICs, DSPs, FPGAs, and/or the like) and memory 42. The control system 38 also includes a network interface 44. In embodiments in which the network node 36 is a radio access node 14, the network node 36 also includes one or more radio units 46 that each include one or more transmitters 48 and one or more receivers 50 coupled to one or more antennas 52. In some embodiments, the functionality of the network node 36 (specifically the functionality of the radio access node 14) described above may be fully or partially implemented in software that is, e.g., stored in the memory 42 and executed by the processor(s) 40.

Figure 9:
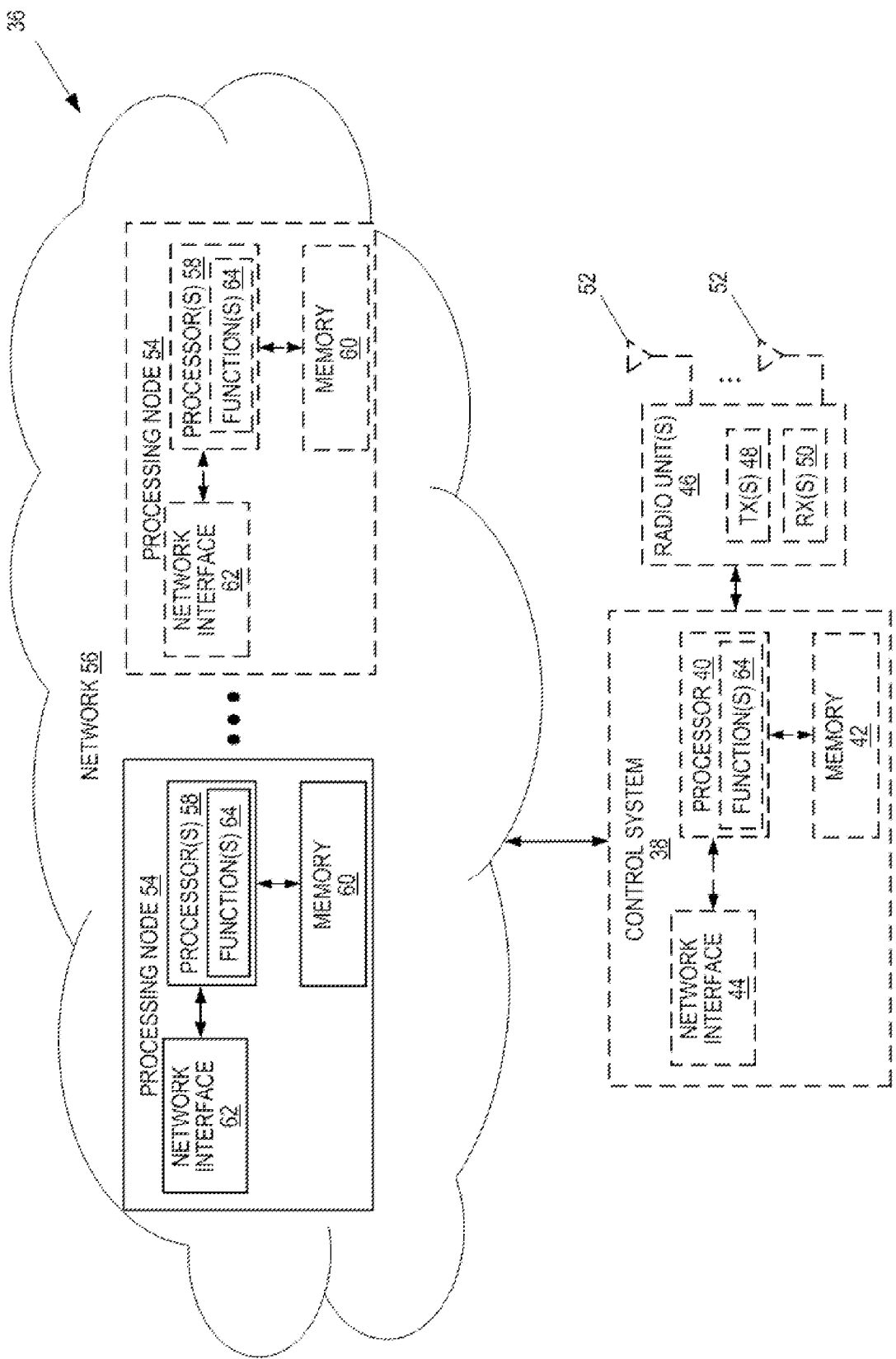

FIG. 9 is a schematic block diagram that illustrates a virtualized embodiment of the network node 36 (e.g., the radio access node 14) according to some embodiments of the present disclosure. As used herein, a "virtualized" network node 36 is a network node 36 in which at least a portion of the functionality of the network node 36 is implemented as a virtual component (e.g., via a virtual machine(s) executing on a physical processing node(s) in a network(s)). As illustrated, the network node 36 optionally includes the control system 38, as described with respect to FIG. 8. In addition, if the network node 36 is the radio access node 14, the network node 36 also includes the one or more radio units 46, as described with respect to FIG. 8. The control system 38 (if present) is connected to one or more processing nodes 54 coupled to or included as part of a network(s) 56 via the network interface 44. Alternatively, if the control system 38 is not present, the one or more radio units 46 (if present) are connected to the one or more processing nodes 54 via a network interface(s). Alternatively, all of the functionality of the network node 36 (e.g., all of the functionality of the radio access node 14) described herein may be implemented in the processing nodes 54. Each processing node 54 includes one or more processors 58 (e.g., CPUs, ASICs, DSPs, FPGAs, and/or the like), memory 60, and a network interface 62.

In this example, functions 64 of the network node 36 (e.g., the functions of the radio access node 14) described herein are implemented at the one or more processing nodes 54 or distributed across the control system 38 (if present) and the one or more processing nodes 54 in any desired manner. In some particular embodiments, some or all of the functions 64 of the network node 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 (if present) or alternatively the radio unit(s) 46 (if present) is used in order to carry out at least some of the desired functions. Notably, in some embodiments, the control system 38 may not be included, in which case the radio unit(s) 46 (if present) communicates directly with the processing node(s) 54 via an appropriate network interface(s).

In some particular embodiments, higher layer functionality (e.g., layer 3 and up and possibly some of layer 2 of the protocol stack) of the network node 36 may be implemented at the processing node(s) 54 as virtual components (i.e., implemented "in the cloud") whereas lower layer functionality (e.g., layer 1 and possibly some of layer 2 of the protocol stack) may be implemented in the radio unit(s) 46 and possibly the control system 38.

In some embodiments, a computer program including instructions which, when executed by the at least one processor 40, 58, causes the at least one processor 40, 58 to carry out the functionality of the network node 36 or a processing node 54 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 42, 60).

Figure 10:
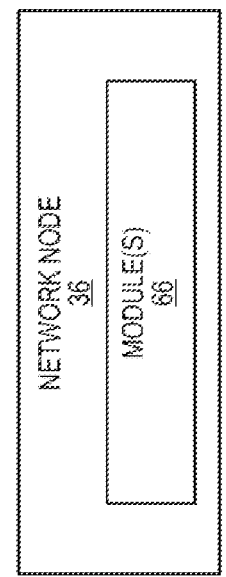

FIG. 10 is a schematic block diagram of the network node 36 (e.g., the radio access node 14) according to some other embodiments of the present disclosure. The network node 36 includes one or more modules 66, each of which is implemented in software. The module(s) 66 provide the functionality of the network node 36 described herein (e.g., the functionality of the radio access node 14-A of FIGS. 3A and 3B).

To perform the method steps above for performing handover, e.g., inter-radio access node handover, from a source cell to a target cell in a wireless communication system 10, the radio access node 14 such as the source radio access node 14-A, may comprise the following arrangement e.g. as depicted in FIG. 10.

The radio access node 14 is adapted to e.g. by means of one of the modules 34 in the wireless communication device 12, such as a configuring module, configure the wireless communication device 12 to:

perform 202, 302, 402 a beam tracking procedure for one or more neighbor cells to provide, for each neighbor cell, a list of tracked beams for the neighbor cell;

upon receiving the handover command from the source radio access node 14-A that instructs the wireless communication device 12 to perform a handover from a source cell, cell A, served by the source radio access node 14-A to a target cell, cell B, served by a target radio access node 14-B, select 214, 306, 308, 312, 316, 318, 406, 408, 412, 416 a beam of the target cell, cell B, from the list of tracked beams for the target cell, cell B, based on random access resource configuration and/or a quality threshold; and perform 216, 310, 314, 320, 322, 410, 414, 418, 420 random access on the selected beam.

The radio access node 14 may further be adapted to e.g. by means of one of the modules 34 in the wireless communication device 12, such as a configuring module, configure the wireless communication device 12 to select 214, 306, 308, 312, 316, 318, 406, 408, 412, 416 the beam of the target cell, cell B, from the list of tracked beams for the target cell, cell B, by determine step 412, NO that there are no dedicated random access channel resources allocated for contention-free random access for the best beam in the list of tracked beams for the target cell, cell B; and upon determining that there are no dedicated random access channel resources allocated for contention-free random access for the best beam in the list of tracked beams for the target cell, cell B:

determine 416 whether a quality of a k-th best beam in the list of tracked beams for the target cell, cell B, is greater than a threshold, the k-th best beam being a beam for which dedicated random access channel resources are allocated, where the selected beam of the target cell is the k-th best beam if the quality of the k-th best beam is greater than the threshold.

The radio access node 14 may further be adapted to e.g. by means of one of the modules 34 in the wireless communication device 12, such as a configuring module, configure the wireless communication device 12 to: if the quality of the k-th best beam is greater than the threshold, perform 216, 310, 314, 320, 322, 410, 414, 418, 420 random access on the selected beam by performing 418 contention-free random access on the k-th best beam using the dedicated random access channel resources of the k-th best beam.

The radio access node 14 may further be adapted to e.g. by means of one of the modules 34 in the wireless communication device 12, such as a configuring module, configure the wireless communication device 12 to, if the quality of the k-th best beam is not greater than the threshold, perform 216, 310, 314, 320, 322, 410, 414, 418, 420 random access on the selected beam by performing 420 contention-based random access on the best beam using the contention-based random access channel resources of the best beam.

Example Embodiments

While not being limited thereto, some example embodiments of the present disclosure are provided below.

1. A method of operation of a wireless communication device (12) to perform handover (e.g., inter-radio access node handover) from a source cell to a target cell in a wireless communication system (10), comprising:

performing (202, 302, 402) a beam tracking procedure for one or more neighbor cells to provide, for each neighbor cell, a list of tracked beams for the neighbor cell;

receiving (212, 306, 406) a handover command from a source radio access node (14-A) that instructs the wireless communication device (12) to perform a handover from a source cell (cell A) served by the source radio access node (14-A) to a target cell (cell B) served by a target radio access node (14-B), wherein the target cell (cell B) is one of the one or more neighbor cells for which the beam tracking procedure is performed;

selecting (214, 306, 308, 312, 316, 318, 406, 408, 412, 416) a beam of the target cell (cell B) from the list of tracked beams for the target cell (cell B) based on random access resource configuration and/or an relative or absolute quality threshold; and performing (216, 310, 314, 320, 322, 410, 414, 418, 420) random access on the selected beam.

2. The method of embodiment 1 wherein selecting (214, 306, 308, 312, 316, 318, 406, 408, 412, 416) the beam of the target cell (cell B) from the list of tracked beams for the target cell (cell B) comprises:

selecting (308, 408) the best beam (i.e., the strongest beam) in the list of tracked beams for the target cell (cell B) if no dedicated random access channel resources are allocated for contention-free random access for any of the beams in the list of tracked beams for the target cell.

3. The method of embodiment 2 wherein performing (216, 310, 314, 320, 322, 410, 414, 418, 420) random access on the selected beam comprises performing (310, 410) contention-based random access on the best beam using contention-based random access channel resources of the best beam.

4. The method of embodiment 1 or 2 wherein selecting (214, 306, 308, 312, 316, 318, 406, 408, 412, 416) the beam of the target cell (cell B) from the list of tracked beams for the target cell (cell B) comprises:

selecting (308, 408) the best beam in the list of tracked beams for the target cell (cell B) if dedicated random access channel resources are allocated for contention-free random access for the best beam in the list of tracked beams for the target cell.

5. The method of embodiment 4 wherein performing (216, 310, 314, 320, 322, 410, 414, 418, 420) random access on the selected beam comprises performing (314, 414) contention free random access on the best beam using the dedicated random access channel resources of the best beam.

6. The method of embodiment 1, 2, or 4 wherein selecting (214, 306, 308, 312, 316, 318, 406, 408, 412, 416) the beam of the target cell (cell B) from the list of tracked beams for the target cell (cell B) comprises:

determining (step 312, NO) that there are no dedicated random access channel resources allocated for contention-free random access for the best beam in the list of tracked beams for the target cell (cell B); and upon determining that there are no dedicated random access channel resources allocated for contention-free random access for the best beam in the list of tracked beams for the target cell (cell B):

determining (316) a difference between a quality of the best beam in the list of tracked beams for the target cell (cell B) and a quality of a k-th best beam in the list of tracked beams for the target cell (cell B), the k-th best beam being a beam for which dedicated random access channel resources are allocated;

determining (318) whether the difference is less than a threshold, where the selected beam of the target cell is the k-th best beam if the difference is less than the threshold.

7. The method of embodiment 6 wherein, if the difference is less than the threshold, performing (216, 310, 314, 320, 322, 410, 414, 418, 420) random access on the selected beam comprises performing (320) contention-free random access on the k-th best beam using the dedicated random access channel resources of the k-th best beam.

8. The method of embodiment 6 or 7 wherein, if the difference is not less than the threshold, performing (216, 310, 314, 320, 322, 410, 414, 418, 420) random access on the selected beam comprises performing (322) contention-based random access on the best beam using the contention-based random access channel resources of the best beam.

9. The method of embodiment 1, 2, or 4 wherein selecting (214, 306, 308, 312, 316, 318, 406, 408, 412, 416) the beam of the target cell (cell B) from the list of tracked beams for the target cell (cell B) comprises:

determining (step 412, NO) that there are no dedicated random access channel resources allocated for contention-free random access for the best beam in the list of tracked beams for the target cell (cell B); and upon determining that there are no dedicated random access channel resources allocated for contention-free random access for the best beam in the list of tracked beams for the target cell (cell B):

determining (416) whether a quality of a k-th best beam in the list of tracked beams for the target cell (cell B) is greater than a threshold, the k-th best beam being a beam for which dedicated random access channel resources are allocated, where the selected beam of the target cell is the k-th best beam if the quality of the k-th best beam is greater than the threshold.

10. The method of embodiment 9 wherein, if the quality of the k-th best beam is greater than the threshold, performing (216, 310, 314, 320, 322, 410, 414, 418, 420) random access on the selected beam comprises performing (418) contention-free random access on the k-th best beam using the dedicated random access channel resources of the k-th best beam.

11. The method of embodiment 9 or 10 wherein, if the quality of the k-th best beam is not greater than the threshold, performing (216, 310, 314, 320, 322, 410, 414, 418, 420) random access on the selected beam comprises performing (420) contention-based random access on the best beam using the contention-based random access channel resources of the best beam.

12. A wireless communication device (12) that performs handover (e.g., inter-radio access node handover) from a source cell to a target cell in a wireless communication system (10), the wireless communication device (12) adapted to:

perform a beam tracking procedure for one or more neighbor cells to provide, for each neighbor cell, a list of tracked beams for the neighbor cell;

receive a handover command from a source radio access node (14-A) that instructs the wireless communication device (12) to perform a handover from a source cell (cell A) served by the source radio access node (14-A) to a target cell (cell B) served by a target radio access node (14-B), wherein the target cell (cell B) is one of the one or more neighbor cells for which the beam tracking procedure is performed;

select a beam of the target cell (cell B) from the list of tracked beams for the target cell (cell B) based on random access resource configuration and/or an relative or absolute quality threshold; and perform random access on the selected beam.

13. The wireless communication device (12) of embodiment 12 wherein the wireless communication device (12) is further adapted to perform the method of any one of embodiments 2 to 11.

14. A wireless communication device (12) that performs handover (e.g., inter-radio access node handover) from a source cell to a target cell in a wireless communication system (10), comprising:

at least one transmitter (28) and at least one receiver (30); and circuitry (20) associated with the at least one transmitter (28) and the at least one receiver (30), the circuitry (20) operable to:

perform a beam tracking procedure for one or more neighbor cells to provide, for each neighbor cell, a list of tracked beams for the neighbor cell;

receive a handover command from a source radio access node (14-A) that instructs the wireless communication device (12) to perform a handover from a source cell (cell A) served by the source radio access node (14-A) to a target cell (cell B) served by a target radio access node (14-B), wherein the target cell (cell B) is one of the one or more neighbor cells for which the beam tracking procedure is performed;

select a beam of the target cell (cell B) from the list of tracked beams for the target cell (cell B) based on random access resource configuration and/or an relative or absolute quality threshold; and perform random access on the selected beam.

15. The wireless communication device (12) of embodiment 12 wherein circuitry (20) is further operable to perform the method of any one of embodiments 2 to 11.

16. A wireless communication device (12) that performs handover (e.g., inter-radio access node handover) from a source cell to a target cell in a wireless communication system (10), comprising:

a beam tracking procedure performing module (34) operable to perform a beam tracking procedure for one or more neighbor cells to provide, for each neighbor cell, a list of tracked beams for the neighbor cell;

a receiving module (34) operable to receive a handover command from a source radio access node (14-A) that instructs the wireless communication device (12) to perform a handover from a source cell (cell A) served by the source radio access node (14-A) to a target cell (cell B) served by a target radio access node (14-B), wherein the target cell (cell B) is one of the one or more neighbor cells for which the beam tracking procedure is performed;

a selecting module (34) operable to select a beam of the target cell (cell B) from the list of tracked beams for the target cell (cell B) based on random access resource configuration and/or an relative or absolute quality threshold; and a random access performing module (34) operable to perform random access on the selected beam.

17. A computer program comprising instructions which, when executed on at least one processor, cause the at least one processor to carry out the method according to any one of embodiments 1 to 11.

18. A carrier containing the computer program of embodiment 17, wherein the carrier is one of an electronic signal, an optical signal, a radio signal, or a computer readable storage medium.

The following acronyms are used throughout this disclosure. 3GPP Third Generation Partnership Project 5G Fifth Generation
- ACK Acknowledgement
- ASIC Application Specific Integrated Circuit
- CBRA Contention-Based Random Access
- CFRA Contention-Free Random Access
- CPU Central Processing Unit
- CSI-RS Channel State Information Reference Signal
- dB Decibel
- DMRS Demodulation Reference Signal
- DSP Digital Signal Processor
- eNB Enhanced or Evolved Node B
- FPGA Field Programmable Gate Array
- gNB New Radio Base Station
- ID Identity
- LTE Long Term Evolution
- MME Mobility Management Entity
- MTC Machine Type Communication
- NR New Radio
- P-GW Packet Data Network Gateway
- PSS Primary Synchronization Signal
- RACH Random Access Channel
- RRC Radio Resource Control
- RSRP Reference Signal Received Power
- RSRQ Reference Signal Received Quality
- SCEF Service Capability Exposure Function
- SINR Signal to Interference plus Noise Ratio
- SS Synchronization Signal
- SSS Secondary Synchronization Signal
- TS Technical Specification
- UE User Equipment Those skilled in the art will recognize improvements and modifications to the embodiments of the present disclosure. All such improvements and modifications are considered within the scope of the concepts disclosed herein.

The invention claimed is:

1. A method of operation of a wireless communication device to perform handover from a source cell to a target cell in a wireless communication system, comprising:
   performing a beam tracking procedure for one or more neighbor cells to provide, for each neighbor cell, a list of tracked beams for the neighbor cell;
   receiving a handover command from a source radio access node that instructs the wireless communication device to perform a handover from a source cell served by the source radio access node to a target cell served by a target radio access node, wherein the target cell is one of the one or more neighbor cells for which the beam tracking procedure is performed;
   selecting a beam of the target cell from the list of tracked beams for the target cell based on random access resource configuration and/or a quality threshold; and
   performing random access on the selected beam;
wherein selecting the beam of the target cell from the list of tracked beams for the target cell comprises:
   determining that there are no dedicated random access channel resources allocated for contention-free random access for the best beam in the list of tracked beams for the target cell; and
   upon determining that there are no dedicated random access channel resources allocated for contention-free random access for the best beam in the list of tracked beams for the target cell:
      determining a difference between a quality of the best beam in the list of tracked beams for the target cell and a quality of a k-th best beam in the list of tracked beams for the target cell, the k-th best beam being a beam for which dedicated random access channel resources are allocated; and
      determining whether the difference is less than a threshold, where the selected beam of the target cell is the k-th best beam if the difference is less than the threshold.

2. The method of claim 1, wherein selecting the beam of the target cell from the list of tracked beams for the target cell comprises:
   determining that there are no dedicated random access channel resources allocated for contention-free random access for the best beam in the list of tracked beams for the target cell; and
   upon determining that there are no dedicated random access channel resources allocated for contention-free random access for the best beam in the list of tracked beams for the target cell:
      determining whether a quality of a k-th best beam in the list of tracked beams for the target cell is greater than a threshold, the k-th best beam being a beam for which dedicated random access channel resources are allocated, where the selected beam of the target cell is the k-th best beam if the quality of the k-th best beam is greater than the threshold.

3. The method of claim 2 wherein, if the quality of the k-th best beam is greater than the threshold, performing random access on the selected beam comprises performing contention-free random access on the k-th best beam using the dedicated random access channel resources of the k-th best beam.

4. The method of claim 2 wherein, if the quality of the k-th best beam is not greater than the threshold, performing random access on the selected beam comprises performing contention-based random access on the best beam using the contention-based random access channel resources of the best beam.

5. The method of claim 1 wherein selecting the beam of the target cell from the list of tracked beams for the target cell comprises:
   selecting the best beam in the list of tracked beams for the target cell if no dedicated random access channel resources are allocated for contention-free random access for any of the beams in the list of tracked beams for the target cell.

6. The method of claim 5 wherein performing random access on the selected beam comprises performing contention-based random access on the best beam using contention-based random access channel resources of the best beam.

7. The method of claim 1, wherein selecting the beam of the target cell from the list of tracked beams for the target cell comprises:
selecting the best beam in the list of tracked beams for the target cell if dedicated random access channel resources are allocated for contention-free random access for the best beam in the list of tracked beams for the target cell.

8. The method of claim 7, wherein performing random access on the selected beam comprises performing contention free random access on the best beam using the dedicated random access channel resources of the best beam.

9. The method of claim 1 wherein, if the difference is less than the threshold, performing random access on the selected beam comprises performing contention-free random access on the k-th best beam using the dedicated random access channel resources of the k-th best beam.

10. The method of claim 1 wherein, if the difference is not less than the threshold, performing random access on the selected beam comprises performing contention-based random access on the best beam using the contention-based random access channel resources of the best beam.

11. The method of claim 1 wherein the quality threshold is any one out of: a relative quality threshold and an absolute quality threshold.

12. A wireless communication device that performs handover from a source cell to a target cell in a wireless communication system, the wireless communication device comprising:
at least one transmitter and at least one receiver; and
circuitry associated with the at least one transmitter and the at least one receiver, the circuitry operable to:
perform a beam tracking procedure for one or more neighbor cells to provide, for each neighbor cell, a list of tracked beams for the neighbor cell;
receive a handover command from a source radio access node that instructs the wireless communication device to perform a handover from a source cell served by the source radio access node to a target cell served by a target radio access node, wherein the target cell is one of the one or more neighbor cells for which the beam tracking procedure is performed;
select a beam of the target cell from the list of tracked beams for the target cell based on random access resource configuration and/or a quality threshold; and
perform random access on the selected beam;
wherein selecting the beam of the target cell from the list of tracked beams for the target cell comprises the circuitry being further operable to:
determine that there are no dedicated random access channel resources allocated for contention-free random access for the best beam in the list of tracked beams for the target cell; and
upon determining that there are no dedicated random access channel resources allocated for contention-free random access for the best beam in the list of tracked beams for the target cell:
determine a difference between a quality of the best beam in the list of tracked beams for the target cell and a quality of a k-th best beam in the list of tracked beams for the target cell, the k-th best beam being a beam for which dedicated random access channel resources are allocated; and
determine whether the difference is less than a threshold, where the selected beam of the target cell is the k-th best beam if the difference is less than the threshold.

13. The wireless communication device of claim 12, wherein the circuitry is further operable to select the beam of the target cell from the list of tracked beams for the target cell by:
determine that there are no dedicated random access channel resources allocated for contention-free random access for the best beam in the list of tracked beams for the target cell; and
upon determining that there are no dedicated random access channel resources allocated for contention-free random access for the best beam in the list of tracked beams for the target cell:
determine whether a quality of a k-th best beam in the list of tracked beams for the target cell is greater than a threshold, the k-th best beam being a beam for which dedicated random access channel resources are allocated, where the selected beam of the target cell is the k-th best beam if the quality of the k-th best beam is greater than the threshold.

14. The wireless communication device of claim 13 wherein the circuitry is further operable to, if the quality of the k-th best beam is greater than the threshold, perform random access on the selected beam by performing contention-free random access on the k-th best beam using the dedicated random access channel resources of the k-th best beam.

15. The wireless communication device of claim 13 wherein the circuitry is further operable to, if the quality of the k-th best beam is not greater than the threshold, perform random access on the selected beam by performing contention-based random access on the best beam using the contention-based random access channel resources of the best beam.

16. The wireless communication device of claim 12 wherein the circuitry is further operable to select the beam of the target cell from the list of tracked beams for the target cell by:
selecting the best beam in the list of tracked beams for the target cell if no dedicated random access channel resources are allocated for contention-free random access for any of the beams in the list of tracked beams for the target cell.

17. The wireless communication device of claim 16 wherein the circuitry is further operable to perform random access on the selected beam by performing contention-based random access on the best beam using contention-based random access channel resources of the best beam.

18. The wireless communication device of claim 12, wherein the circuitry is further operable to select the beam of the target cell from the list of tracked beams for the target cell by:
selecting the best beam in the list of tracked beams for the target cell if dedicated random access channel resources are allocated for contention-free random access for the best beam in the list of tracked beams for the target cell.

19. The wireless communication device of claim 18, wherein the circuitry is further operable to perform random access on the selected beam by performing contention free random access on the best beam using the dedicated random access channel resources of the best beam.

* * * * *